US007961872B2

(12) United States Patent
Bolotov et al.

(10) Patent No.: US 7,961,872 B2
(45) Date of Patent: Jun. 14, 2011

(54) FLEXIBLE HARDWARE ARCHITECTURE FOR ECC/HECC BASED CRYPTOGRAPHY

(75) Inventors: Anatoli A. Bolotov, Cupertino, CA (US); Mlkhail I. Grinchuk, San Jose, CA (US); Paul G. Filseth, Los Gatos, CA (US); Lav D. Ivanovic, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 830 days.

(21) Appl. No.: 11/999,211

(22) Filed: Dec. 4, 2007

(65) Prior Publication Data
US 2008/0130873 A1      Jun. 5, 2008

Related U.S. Application Data

(60) Provisional application No. 60/868,493, filed on Dec. 4, 2006.

(51) Int. Cl.
*H04L 9/28* (2006.01)
(52) U.S. Cl. ............... 380/28; 380/30; 713/189; 726/26
(58) Field of Classification Search ...................... 380/28
See application file for complete search history.

(56) References Cited

U.S. PATENT DOCUMENTS

| | | | | |
|---|---|---|---|---|
| 5,148,485 | A * | 9/1992 | Dent | 380/46 |
| 5,680,597 | A * | 10/1997 | Kumar et al. | 712/226 |
| 6,671,815 | B2 * | 12/2003 | Iwamura et al. | 713/324 |
| 7,185,039 | B2 * | 2/2007 | Grinchuk | 708/491 |
| 7,461,115 | B2 * | 12/2008 | Eberle et al. | 708/491 |
| 7,508,936 | B2 * | 3/2009 | Eberle et al. | 380/30 |
| 2002/0099963 | A1 * | 7/2002 | Iwamura et al. | 713/300 |
| 2003/0123654 | A1 * | 7/2003 | Lambert | 380/28 |
| 2004/0091105 | A1 * | 5/2004 | Kim et al. | 380/30 |
| 2004/0114760 | A1 * | 6/2004 | Brown et al. | 380/255 |
| 2004/0236813 | A1 * | 11/2004 | Grinchuk | 708/492 |
| 2005/0025311 | A1 * | 2/2005 | Eisentraeger et al. | 380/28 |
| 2007/0211894 | A1 * | 9/2007 | Akishita et al. | 380/30 |

OTHER PUBLICATIONS

Hardware Architectures of Elliptic Curve Based Cryptosystems Over Binery Fields, Chung Shu, Jan. 2007.*
"Hardware Architectures of Elliptic Curve based Cryptosystems over Binary Fields; by Chang Shu; Jan. 2007".*

* cited by examiner

*Primary Examiner* — Kambiz Zand
*Assistant Examiner* — Yonas Bayou
(74) *Attorney, Agent, or Firm* — Luedeka, Neely & Graham, P.C.

(57) ABSTRACT

A circuit for implementing elliptic curve and hyperelliptic curve encryption and decryption operations, having a read only memory with no more than about two kilobytes of accessible memory, containing first programming instructions. An arithmetic logic unit has access to second programming instructions that are resident in a gate-level program disposed in the arithmetic logic unit, and is operable to receive data from no more than one input FIFO register. A microcontroller has no more than about two thousand gates, and is adapted to read the first programming instructions from the read only memory, send control signals to the arithmetic logic unit, and receive flags from the arithmetic logic unit. The arithmetic unit reads the third programming instructions, selectively performs elliptic curve and hyperelliptic curve encryption and decryption operations on the data according to the second programming instructions and the microcontroller, and sends output to no more than one output FIFO register.

1 Claim, 3 Drawing Sheets

FLEXIBLE HARDWARE ARCHITECTURE FOR ECC/HECC BASED CRYPTOGRAPHY

This application claims all priorities and other benefits of prior pending U.S. provisional application 60/868,493, filed Dec. 4, 2006.

FIELD

This invention relates to efficient and flexible architecture and implementation method for a public-key cryptographic module that provides acceleration or full implementation of cryptographic schemes/protocols and primitives based on elliptic curve cryptography (ECC) or hyperelliptic curve cryptography (HECC).

BACKGROUND

Elliptic curve cryptography (ECC) is an approach to public-key cryptography based on the algebraic structure of elliptic curves over finite fields. Hyperelliptic curve cryptography (HECC) is a similar approach which is based on hyperelliptic curves over finite fields.

An elliptic curve (EC) modulo p may be defined as the set of points P=(x,y) satisfying the curve equation $y^2=x^3+ax+b$ (mod p), where a and b are constant (satisfying $4a^3+27b^2 \ne 0$ (mod p)), plus a "point at infinity" O. With a suitable definition of addition of points P+Q (and doubling 2P=P+P as being a special case of addition when two points are equal) together with the zero point O, this forms an additive group.

Scalar multiplication of a point P by a number k is defined as the result of adding point P to itself k times: kP=P+P+ . . . +P (k times). The elliptic curve discrete logarithm problem is then defined as follows: given the prime modulus p, the curve constants a and b, and two points P and Q, find a number k such that Q=kP. This problem is infeasible for secure elliptic curves for large enough values of p, and thus scalar multiplication is the basic cryptographic operation of an elliptic curve $EC_k(P)=kP$.

Because it is a one-way function, $EC_k(P)$ is widely used in common and well-defined cryptographic applications such as encryption and decryption, digital signature generation and verification, key agreement, and key transport to form elliptic curve cryptography variants of those applications.

A hyperelliptic curve (HEC) of genus g over $Z_p$ is defined as the set of points P=(x,y) satisfying the curve equation $y^2+R(x)y=Q(x)$ (mod p), where R(x) and Q(x) are monatomic polynomials over $Z_p$, and for some integer g—called the genus of the curve—R has a degree that does not exceed g, and Q has a degree of 2g+1. Special conditions for R and Q need to be satisfied for the curve to be nonsingular.

Similar to that as described above in regard to elliptic curves, an additive group can also be associated with hyperelliptic curves. This group is formed with all so-called reduced divisors. A reduced divisor is a pair D of polynomials U(x) and T(x), D=(U,T), with deg(T)<deg(U)<=g such that $T^2+R(x)T=Q(x)$ (mod U(x)).

With a suitable definition of an addition operation of divisors $D_1+D_2$, this forms an additive group. Scalar multiplication of a group element (divisor) D by a number k is defined as the result of adding D to itself k times: kD=D+D+ . . . +D (k times).

The hyperelliptic curve discrete logarithm problem is defined in a similar way as that for the elliptic curve described above: given a nonsingular hyperelliptic curve and two group elements (divisors) $D_1$ and $D_2$, find a number k such that $D_1=kD_2$. This problem is infeasible for a secure hyperelliptic curve for which the group order is divisible by a sufficiently large prime number, and thus scalar multiplication is the basic cryptographic operation of hyperelliptic curve based cryptography.

What is needed, therefore, is a cryptographic arithmetical module that provides acceleration for computation of the cryptographic primitives or provides full implementation of the cryptographic protocols based on elliptic curve cryptography (ECC) or hyperelliptic curve cryptography (HECC).

SUMMARY

The above and other needs are met by providing efficient and flexible architecture and implementation method for a public-key cryptographic module that provides acceleration or full implementation of the cryptographic schemes/protocols and primitives based on elliptic curve cryptography (ECC) or hyperelliptic curve cryptography (HECC) defined over finite field $Z_p$ with large enough prime number p. This architecture is also very well suitable for other arithmetic computations over $Z_p$ of different nature and can be also generalized for polynomial/arithmetic computations over other finite fields.

One embodiment of the invention provides a circuit for implementing elliptic curve and hyperelliptic curve encryption and decryption operations, having a read only memory with no more than about two kilobytes of accessible memory, containing first programming instructions. An arithmetic logic unit has access to second programming instructions that are resident in a gate-level program disposed in the arithmetic logic unit, and is operable to receive data from no more than one input FIFO register. A microcontroller has no more than about two thousand gates, and is adapted to read the first programming instructions from the read only memory, send control signals to the arithmetic logic unit, and receive flags from the arithmetic logic unit. The arithmetic unit reads the third programming instructions, selectively performs elliptic curve and hyperelliptic curve encryption and decryption operations on the data according to the second programming instructions and the microcontroller, and sends output to no more than one output FIFO register.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
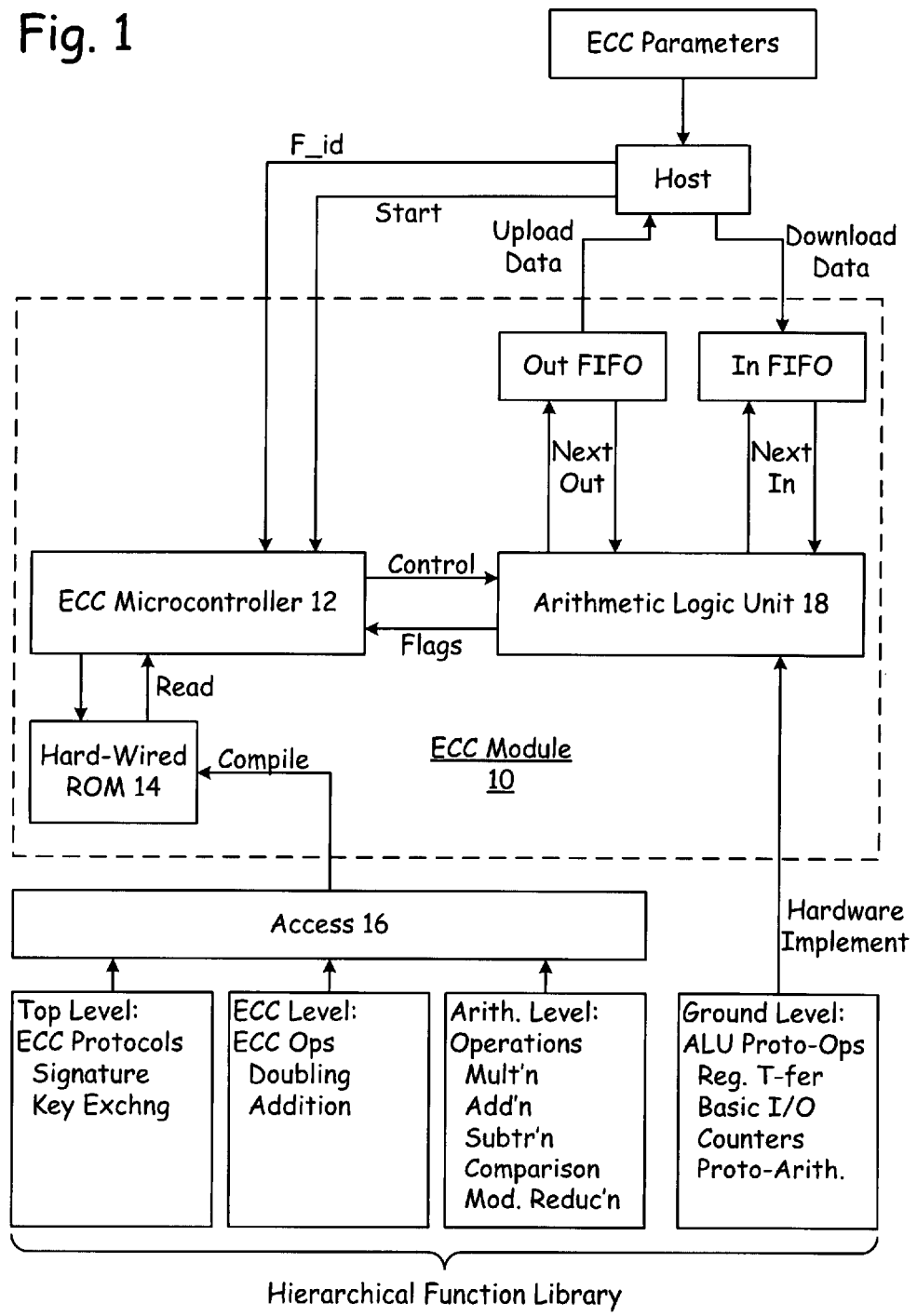
FIG. 1 an architecture of an ECC engine according to an embodiment of the present invention.

With general reference to the figures, the present invention specifies an efficient architecture for a public-key cryptographic module 10 that provides acceleration or full implementation of various elliptic curve cryptography (ECC) and hyperelliptic curve cryptography (HECC) protocols, defined over a finite field $Z_p$ with a sufficiently large prime number p. This architecture is also very well suited for other arithmetic computations over finite fields $Z_p$ of a different nature, and can also be generalized for polynomial and arithmetic computations over other finite fields.

One aspect of the present invention is a built-in controller 12 that is under the direction of a binary file in the module's internal memory 14. The binary file is executed during runtime under either internal or external control. The binary program consists of separate blocks or subprograms that can be called from an external device 16 such as a control module or a microprocessor. An arithmetic logic unit 18 is provided, with an internal memory that can be individually adjusted for the various cryptography modules to be implemented. Alternately, the software part is completely hardwired.

The architecture of the present invention can be used to implement various cryptosystem and cryptographic protocols such as:

A. ECC/HECC cryptosystems over the finite field $GF(2^n)$, or more generally $G(p^n)$, where p is a small prime number such as three or seven, and n is a sufficiently large integer (dimensionality).

B. RSA cryptosystems over $Z_n$, where n=pq, for two sufficiently large prime numbers p and q.

C. DH protocol over $Z_p$ and other algebraic groups with difficult discrete logarithm computations.

D. ECC/HECC pairing-based cryptography over $Z_p$ (e.g. multiparty key exchange protocols, identity-based encryption/decryption, and so on).

Each of these different cryptographic implementations typically requires a specialized arithmetic unit that is optimized for the given implementation, and which would not function well for any other implementation.

The features of the present invention are described below in regard to an ECC-based cryptography implementation over $Z_p$.

One embodiment of the present invention includes (1) a built-in microcontroller 12, (2) an auxiliary memory for storing data, (3) internal registers, (4) a scalable general arithmetic logic unit 18 (ALU) for modular arithmetic computation over $Z_p$ for any $p<2^N$, where N is a preset limit size for the binary presentation of integers, e.g. N=256, (5) microprogram code for ECC/HECC, where the code can be downloaded into read-only memory 14 or hardwired for extra security, and (6) a library of subprograms in an assembly-like microprogramming language.

For example, in the most practical case of ECC, an architecture according to the present invention provides the following functions: Elliptic Curve Key Pair Generation, Elliptic Curve Public Key Validation, Elliptic Curve Digital Signature Algorithm (the ECDSA standard), Signature Scheme Setup, Signing Operation (SigGen), Verifying Operation (SigVer), Elliptic Curve Diffie-Hellman (ECDH), Elliptic Curve Integrated Encryption System (ECIES), ECC-based One-way Function, and Modular Multiplication Operation (prime modulo).

ECC Engine Architecture

One embodiment of an architecture according to the present invention is presented in FIG. 1. The ECC engine can support any elliptic curve of prime modulus p that does not exceed some preset limit, such as $p<2^{256}$. In this 256-bit example, six basic 256-bit ECC parameters describe the elliptic curve, and the ECC engine takes in up to six task-specific inputs, comprising six additional 256-bit words. Thus, the ECC engine is programmable and is controlled by up to twelve 256-bit registers. These parameters are as follows: p is the main prime number ($p<2^{256}$) to define the elliptical curve over $Z_p$. The parameters a and b are 256-bit coefficients defining the elliptic curve $y^2=x^3+ax+b$ (mod p). $P_x$ and $P_y$ are 256-bit coordinates of base point $P=(P_x, P_y)$ on the elliptic curve. The parameter n is another big prime number (where $n<2^{256}$): order of point P, i.e. minimal integer number satisfying nP=0. Typically, n is very close to p. The values of p, a, b, $P_x$, $P_y$, n are defined by various standards. "Seed" is a 256-bit parameter that is used for embedded randomization and built-in side-channel attack countermeasures. Up to six extra 256-bit parameters are task specific input arguments.

Elliptic Curve Data Path

The data path of one embodiment is constructed with an arithmetic logic unit 18, a microprogramming control engine 12, an Open Core Protocol (OCP) interface control module, a command register for external control, a memory arbiter to switch access to the internal memory, and internal parallel memory banks consisting of nine 1-port Read/Write memory banks containing 64 32-bit words each, for storing parameter, input/output and auxiliary (internal) registers.

When the GO field of the command register is set at a high value, along with a specified ECC task, an internal controller 12 reads from the memory all of the elliptical curve parameter registers and the task specific input registers, and sends the data to the elliptical curve datapath, which executes the ECC microprogram according to the precompiled, internally-stored (hardwired or downloaded) microcode.

ECC ALU Architecture

Figure 2:
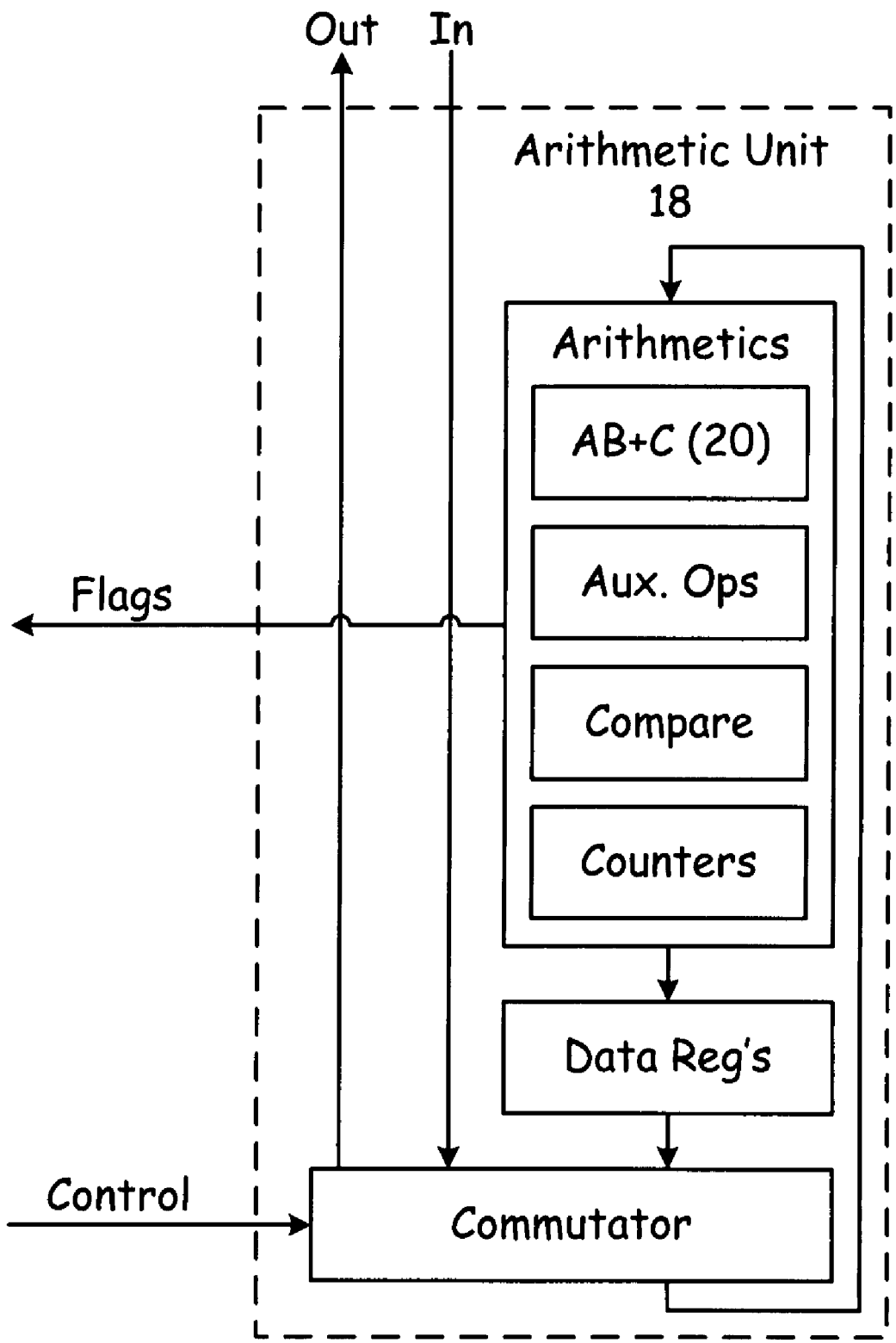
FIG. 2 is a functional block diagram of an arithmetic unit of an ECC engine according to an embodiment of the present invention.

One embodiment of an arithmetic logic unit 18 is depicted in FIG. 2. In the practical case of arithmetic conducted in $Z_p$, the block 20 of computing AB+C by modulo p can be implemented, for example, based on the method proposed by M. Grinchuk in Multiplier For Modular Exponentiation, as described in U.S. Pat. No. 7,185,039, the entire disclosure of which is incorporated herein by reference.

The entire computation is executed under the control sequence or command flow (via CONTROL signals) issued by a controller 12, which in turn executes a precompiled microprogram. The FLAGS signals provide the feedback for executing conditional statements in the microprogram.

The arithmetic unit 18 is well-suited to the incorporation of the built-in side-channel and other physical/chemical attacks countermeasures.

ECC Microprogramming Architecture

Figure 3:
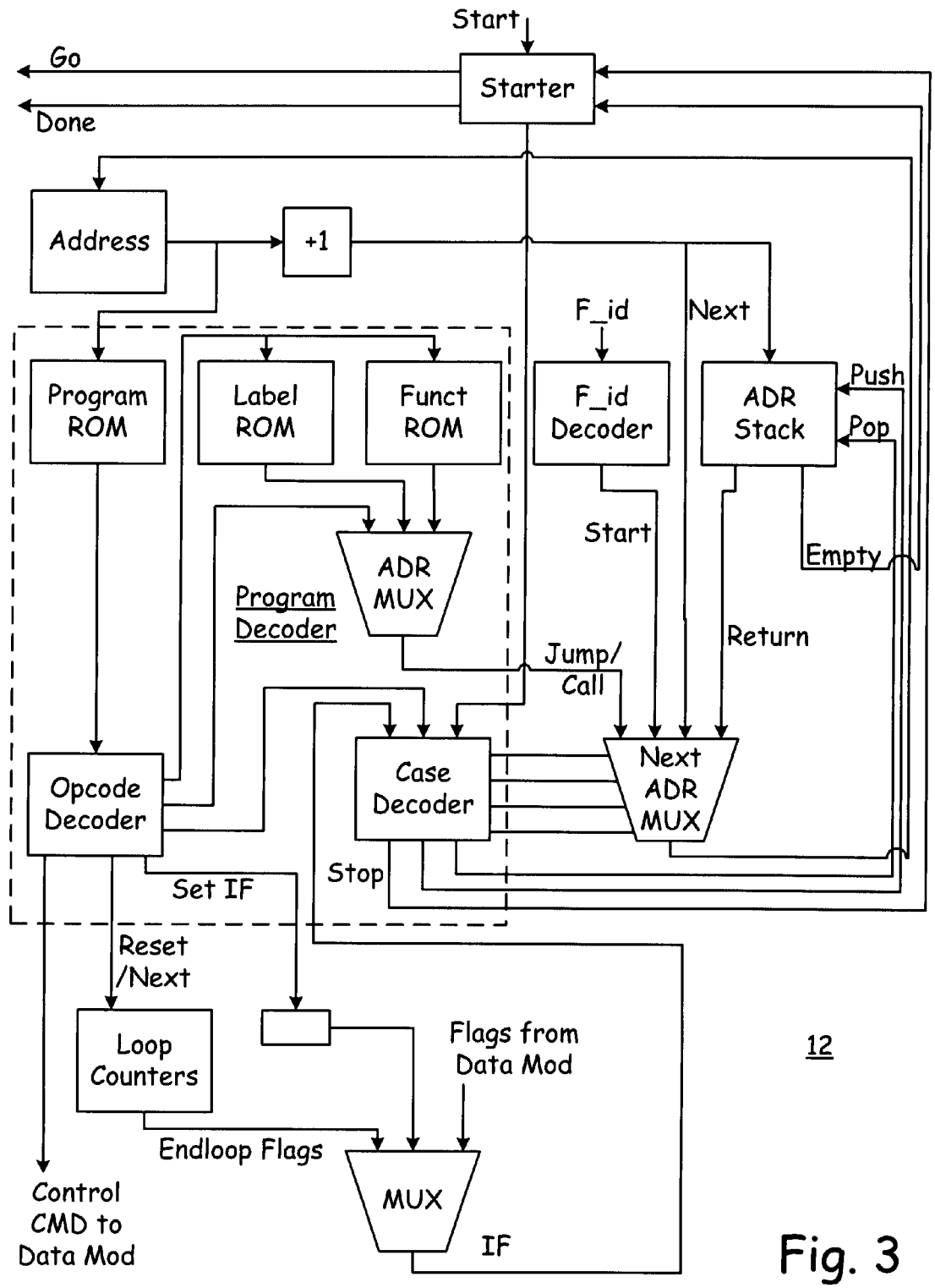
FIG. 3 is a functional block diagram of a microcontroller of an ECC engine according to an embodiment of the present invention.

As mentioned above, the architecture includes a specialized, tiny, built-in microcontroller 12 that executes the precompiled microprogram, which is written in a special command language that is specially designed and adjusted for the particular arithmetic unit 18, to match it precisely for the specific tasks/protocols that need to be implemented. This is depicted in FIG. 3.

The lower-level functions in the hierarchical library of subprograms in the microprogram are hardware encoded in the arithmetic unit 18. However, these functions can be modified in software.

Higher-level functions are implemented as software subprograms that call the lower-level functions, and generally do not require special hardware support in the arithmetic unit. Thus, the top-level functions are programmed in a special command language. In this manner, when a new protocol is implemented, or an old protocol is edited, a new top-level subprogram is written—or an existing one is edited—recompiled, and downloaded into the module to support the new top-level protocols. This provides flexibility to the present architecture that is not found in other implementations.

Universal embedded processors or microcontrollers have disadvantages in comparison to the proposed microcontroller 12. For example, the proposed microcontroller 12 can be implemented in a very small area, with an internally-stored microcode of only one to two kilobytes. In addition, one can directly optimize the overall run time, as a microprogram can be written such that the arithmetic block is running and making useful computations without unwanted interactions and delays. Thus, the overall runtime is determined by the speed of arithmetic block and the structure of the microprogram library, and can be adjusted for the desire speed and area versus performance tradeoff. In the present architecture, this enables one to develop parameterized compilers generating netlists with preset area/performance characteristics.

General commands include:
SEND(d)
RETURN
RETURN_IF_0
RETURN_IF_1
STAND_BY
STOP
STOP_IF_0
STOP_IF_1
SET_IF(d)
CALL(m)
JUMP_IF_1(m)
JUMP_IF_0(m)

A sample program reads as follows:
FUNCTION("F0_main");
1 SEND(cmd_1); SET_IF(port_C);
2 SEND(cmd_2); JUMP_IF_0("L0");
3 SEND(cmd_D); RETURN;
LABEL("L0");
4 SEND(cmd_3); CALL("F1");
5 SEND(cmd_B); STOP;
SUBFUNCTION("F1_aux");
6 SEND(cmd_4); SET_IF(port_D);
LABEL("L1");
7 SEND(cmd_5);
8 SEND(cmd_6); JUMP_IF_1("L1");
9 SEND(cmd_7); SET_IF(port_B);
10 SEND(cmd_8); JUMP_IF_0("L2");
11 SEND(cmd_D); RETURN;
LABEL("L2");
12 SEND(cmd_9); SET_IF(port_E);
13 SEND(cmd_A); RETURN_IF_0;
14 SEND(cmd_D); RETURN;

The program is a set of function and subfunctions. Functions can be accessible externally while subbfunctions cannot. Command lines are optionally numerated. Function and subfunction names are optionally numerated by inserting an index into the name.

A sample program for the ROM 14 is given below:
module ECC_PROG (addr, data);
input [7:0] addr;
output [0:11] data;
wire n3, n4, n5, n6, n7, n8, n9, n10, n11, n12, n13, n14, n15, n16, n17, n18, n19, n20, n21, n22, n23, n24, n25, n26, n28, n29, n30, n31, n32;
NR4M1P U41 (.A(addr[5]), .B(addr[4]), .C(addr[7]), .D(addr[6]), .Z(n32));
AND4M1P U42 (.A(n24), .B(n6), .C(n13), .D(n7), .Z(n21));
ND2M1P U43 (.A(n19), .B(n9), .Z(n5));
ND4DNM1P U44 (.D(n5), .A(n24), .B(n17), .C(n11), .Z(data[2]));
ND2M1P U45 (.A(n24), .B(n6), .Z(n16));
ND4M1P U46 (.A(n17), .B(n11), .C(n7), .D(n8), .Z(data[10]));
ND4M1P U47 (.A(n10), .B(n8), .C(n14), .D(n15), .Z(data[5]));
NR2M1P U48 (.A(n5), .B(n16), .Z(n15));
ND4M1P U49 (.A(n13), .B(n12), .C(n17), .D(n18), .Z(data[4]));
AND3M1P U50 (.A(n10), .B(n19), .C(n6), .Z(n18));
ND4M1P U51 (.A(n6), .B(n7), .C(n8), .D(n9), .Z(data[8]));
ND3M1P U52 (.A(n10), .B(n11), .C(n12), .Z(data[7]));
ND3M1P U53 (.A(n12), .B(n11), .C(n13), .Z(data[6]));
ND2M1P U54 (.A(n21), .B(n10), .Z(data[11]));
ND2M1P U55 (.A(n21), .B(n14), .Z(data[3]));
NR2BNM1P U56 (.B(n30), .A(n31), .Z(n23));
AOI22CDNM1P U47 (.A(n25), .B(n20), .C(n29), .D(n22), .Z(n24));
NR2M1P U58 (.A(n4), .B(n28), .Z(n29));
ND2M1P U59 (.A(n28), .B(n20), .Z(n11));
ND2M1P U60 (.A(n23), .B(n3), .Z(n10));
ND2M1P U61 (.A(n4), .B(n26), .Z(n8));
ND2M1P U62 (.A(n20), .B(n23), .Z(n7));
ND2M1P U63 (.A(n26), .B(n25), .Z(n17));
ND2M1P U64 (.A(n20), .B(n4), .Z(n12));
AND2M1P U65 (.A(n30), .B(n31), .Z(n4));
ND2M1P U66 (.A(n28), .B(n3), .Z(n13));
ND2M1P U67 (.A(n28), .B(n26), .Z(n6));
ND2ANM1P U68 (.A(n22), .B(n23), .Z(n14));
ND2M1P U69 (.A(n26), .B(n23), .Z(n19));
ND2M1P U70 (.A(n25), .B(n3), .Z(n9));
AO21M1P U71 (.A(n3), .B(n4), .C(n5), .Z(data[9]));
NR2BNM1P U72 (.B(addr[1]), .A(addr[0]), .Z(n20));
NR2BNM1P U73 (.B(addr[0]), .A(addr[1]), .Z(n26));
NR2M1P U74 (.A(addr[1]), .B(addr[0]), .Z(n3));
AND3M1P U75 (.A(n31), .B(n32), .C(addr[3]), .Z(n28));
AND3M1P U76 (.A(addr[2]), .B(n32), .C(addr[3]), .Z(n25));
NR2BNM1P U77 (.B(n32), .A(addr[3]), .Z(n30));
N1M1P U78 (.A(addr[2]), .Z(n31) );
ND2M1P U79 (.A(addr[1]), .B(addr[0]), .Z(n22));end-module This programming can be synthesized from the program ROM, label ROM, and function ROM, as depicted in FIG. 3. In one embodiment, the program ROM has a 256 line limit, the label ROM has a 16 line limit, and the function ROM has a 16 line limit.

Exemplary programming for these ROMs is given below:
Program ROM:
000000000100
000001001010
000010110000
001101000001
000011010001
001011000100
000100001011
000101000000
000110100001
000111001001
001000110010
001101000001
001001001100
001010000010
001101000001
000000000000
. . .
Label ROM:
00000100
00000111
00001100
00000000
. . .
Function ROM:
00000001
00000110
00000000
. . .

The embodiments of the invention as described herein have the following characteristics:
1. An efficient and flexible architecture and implementation method for a public-key cryptographic module that provides acceleration of computation for cryptographic primitives, or provides full hard-wired implementation of cryptographic schemes/protocols based on elliptic curve cryptography (ECC) or hyperelliptic curve cryptography (HECC) defined over finite field $Z_p$ with large enough prime number p.
2. The architecture is well suited for other arithmetic computations over $Z_p$ of a different nature, and can also be generalized for polynomial/arithmetic computations over other finite fields.
3. A specialized very tiny built-in controller with a small size program that is precompiled into a binary file and then downloaded into module's internal memory and then executed during runtime under internal and external control. This program consists of separate blocks of subprograms that can be called from external control module or external microprocessor.
4. A compact and simple command language specially designed for running and execution of the arithmetical computations and manipulating with data, e.g. reading/storing data from/to memory, moving data from one internal register to another and so on.
5. Low (ground) level of the functions/operations from the hierarchical library of the subprograms are hardware supported in the arithmetic logic unit during the arithmetic logic unit development/implementation stage. All higher level operations appear to be subprograms calling lower level functions/subfunctions and generally do not require special hardware support in the arithmetic logic unit.
6. Allows small (one to two kilobyte) size microprogram for entirely hard-wired implementation for ECC/HECC based cryptographic primitives/protocols.
7. Microprogram can be downloaded into internal memory or hard-wired for extra security. Expandable library of subprograms in an assembler-style, specially-developed microprogramming language.
8. A highly optimized specialized arithmetical block arithmetic logic unit (with auxiliary internal memory) that can be effectively adjusted for particular cryptographic applications required to perform modular polynomial/arithmetic computations. The proposed architecture is well suited to the incorporation of the built-in side channel and other physical/chemical attacks countermeasures.

The architectures proposed herein are different from what is currently available in the following ways:
1. No tiny fully hard-wired controller.
2. 1-2 KB binary table for entire fully hardwired ECCDSA protocol.
3. Embedded processors and microcontrollers (MIPS, Tensilica, ARM, and the like) based solutions slow down the process of computation and have a much larger program size.
4. Hierarchical flexible set of functions where low (ground) level of the functions/operations from the hierarchical library of the ECC/HECC subprograms are hardware supported in the arithmetic logic unit during the arithmetic logic unit development/implementation stage, whereas all higher level operations or protocols appear to be subprograms calling lower level functions/subfunctions and generally do not require special hardware support in the arithmetic logic unit. This speeds up implementation and provides good testability, flexibility, edit opportunity, add, change, or deletion of protocols. There are no such fully hardware solutions that supports all of this.
5. Built-in tiny random generator to support side channel and other countermeasures.
6. Proposed implementation and hardware is friendly for validation and certification.
7. Scalability—in particular support any elliptic curve for any prime number not exceeded preset limit.
8. Actually allow to build compiler generating ECC/HECC netlists for particular requirements regarding speed area timing.
9. Flexibility—by changing microcode/compiler binary table, one can reconfigure hardware for different tasks.
10. Testability—the presented architecture provides opportunity to test and debug hardware starting from the "toy" elliptic curves, which allow, for example, to make an exhaustive search and test of all possible cases when doing ECC/HECC operations.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A circuit for implementing elliptic curve and hyperelliptic curve encryption and decryption operations, the circuit comprising:
   a read only memory having no more than about two kilobytes of accessible memory, the read only memory containing first programming instructions,
   an arithmetic logic unit having access to second programming instructions that are resident in a gate-level program disposed in the arithmetic logic unit, and operable to receive data from no more than one input FIFO register, and
   a microcontroller having no more than about two thousand gates, the microcontroller adapted to read the first programming instructions from the read only memory, send control signals to the arithmetic logic unit, and receive flags from the arithmetic logic unit,
   where the arithmetic logic unit reads the second programming instructions, selectively performs elliptic curve and hyperelliptic curve encryption and decryption operations on the data according to the second programming instructions and the microcontroller, and sends output to no more than one output FIFO register.

* * * * *